Figure 1:
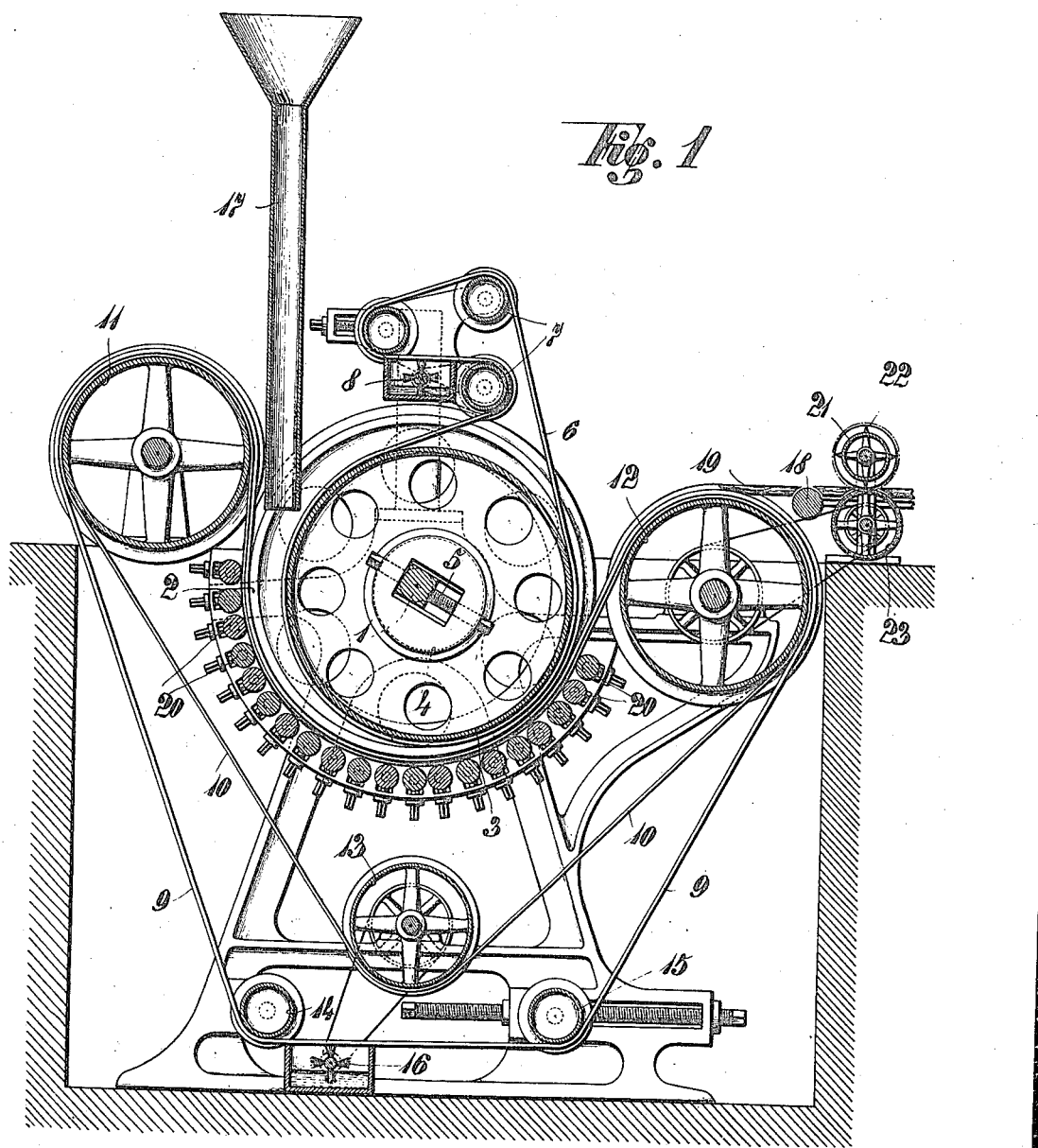

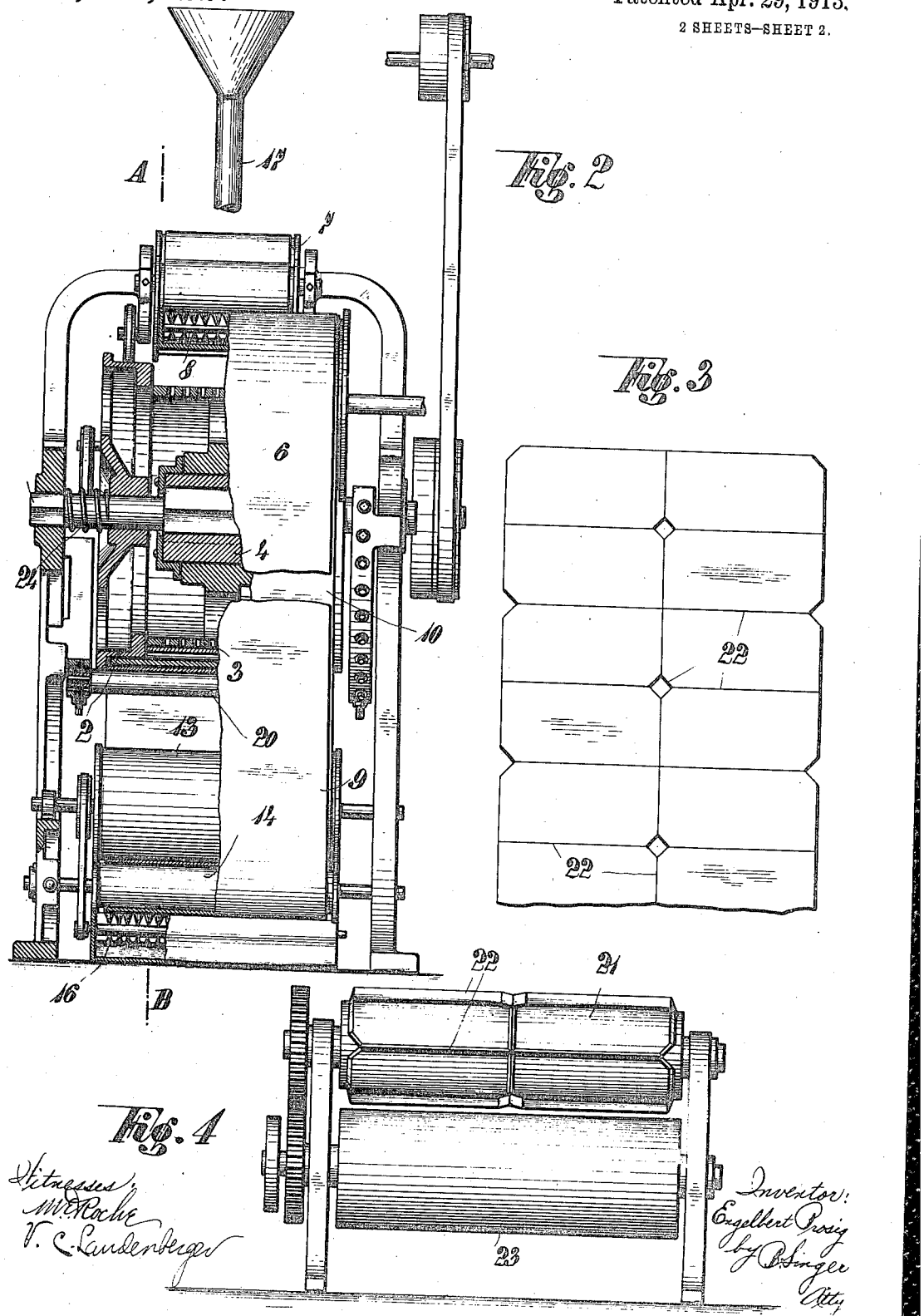

UNITED STATES PATENT OFFICE.

ENGELBERT PROSIG, OF MÄHRISCH-SCHÖNBERG, AUSTRIA-HUNGARY.

MACHINE FOR THE MANUFACTURE OF ARTIFICIAL SLATES AND SUCH LIKE.

1,060,122.  Specification of Letters Patent.  Patented Apr. 29, 1913.

Application filed October 9, 1911. Serial No. 653,736.

*To all whom it may concern:*

Be it known that I, ENGELBERT PROSIG, municipal turbine attendant, a subject of the Emperor of Austria-Hungary, residing at Klein Venedig 7, Mährisch-Schönberg, Austria-Hungary, have invented new and useful Improvements in Machines for the Manufacture of Artificial Slates and such Like, of which the following is a specification.

Up to the present time it has been common to employ in the manufacture of artificial slate made of cement and asbestos, millboard machines as generally used for the manufacture of paper and pasteboard and in which machines each artificial slate is formed by a number of single layers, but artificial slates so formed have the disadvantage that in case of fire they cannot resist the heat for the reason that the various layers of material comprising the slate separate from each other and shiver off or bend upward, thereby making the roof inaccessible for firemen.

These disadvantages are obviated by the artificial slates made by the machine as constructed under this invention, and in its essential feature this machine consists in that the raw material can be fed to same so as to form an uninterrupted single layer of material between an eccentrically fitted drum and a band running over same, whereby the material is pressed and finally cut into pieces or plates of the desired size.

The present invention has the further advantage that artificial slates made by same can be used on either side while artificial slates manufactured by machines heretofore could only be used on one side.

In order that my invention may be clearly understood I have hereunto appended explanatory drawings whereon:

Figure 1 is a longitudinal section of the machine taken on line A—B, Fig. 2. Fig. 2 is a back view of the machine partly in section. Fig. 3 shows a portion of the material after it leaves the cutting mechanism and Fig. 4 is a detail view of the cutting mechanism.

Referring to the drawings, 1 designates a fixed shaft on which are fitted two loosely revoluble disks 2, between which a perforated drum 3, is loosely mounted on an adjustable eccentric disk 4 whose eccentricity to the shaft 1 can be varied or adjusted as required by means of screws 5. An endless felt band or its equivalent 6 passes around the drum 3 being of the same width as the latter, and it also passes around rollers 7, one of which is made adjustable to enable the band to be tightened up or adjusted as required. The band 6 also passes through a washing device 8 for the purpose of continuously cleansing it or removing from its surface the adhering particles of the plastic mass. Another endless band or its equivalent 9 passes around the two lateral disks 2, and over this band is fitted an endless perforated metallic band 10. Both of these bands rest only against the lower half of the disks 2 and run together in contact over the two rollers 11 and 12 while in the lower part of the machine they are moved apart, the metal band 10 running over a roller 13 while the band 9 runs over a fixed roller 14 and an adjustable roller 15 whereby the tension on the band can be regulated. A washing device 16 is also provided between the rollers 14 and 15 for the purpose of cleansing the surface of the band 9 and removing therefrom any adhering particles of the plastic mass.

The material for forming the artificial slates and such like may be mixed in any suitable manner in an agitator or such like placed preferably above the machine so as to form a plastic mass which is continuously fed by means of a pipe or duct 17 provided with a hopper opening between the two felt bands or their equivalent 6 and 9, on to the drum 3. In consequence of the eccentric position of the drum 3, the space from the lower extremity of the pipe or duct 17 between the bands 6 and 9 gradually narrows whereby the material is compressed more and more, and whereby the water from both sides is continuously running off through the felt bands 6 and 9 and the perforated metallic band 10 and the perforated drum 3 respectively. In this manner the compressed material forming the artificial slates is not only drained from below but also from above and at the same time is pressed to the desired thickness, so that a homogeneous band of material is formed, which, when cut to the desired size, will not peel off or separate into layers. A number of adjustable pressure rollers 20 may be fitted below the perforated drum 3 to firmly press the metallic band 10 and the felt band 9 against the disk 2 and the mass to be pressed, while the disk 2 is firmly pressed against the drum 3 by means of springs 24 fitted on the side of the shaft 1. The compressed plastic mass passes over the roller 12 and a guide roller 18 to a table 19 which is provided with a cutting roller 21 having knives 22 (Fig. 3), and a counter-roller 23. The two rollers 21 and 23 are preferably connected by suitable gearing and may be actuated from the shaft of the roller 12, from which the whole machine is driven. The artificial slates cut from the plastic mass in the cutting arrangement 21, 22, 23 are then removed by means of metal plates, and are with them laid one above the other and thereafter placed in a suitable press so that the surfaces which are still rough are smoothed while the remaining moisture is also removed. In place of using endless felt bands, as described, porous woven straps or the like may be used if desired.

Having now fully described my invention, what I claim as new and desire to secure by Letters Patent is:

1. In a machine for compressing a plastic mass into a predetermined form comprising in combination, spaced disks, a belt trained about a portion thereof and forming one wall of a compressing passage, a drum disposed between said disks and forming the opposite wall of said passage, said drum being eccentrically disposed with respect to said disks to reduce the size of said discharge end of said passage with respect to the intake end, and an endless belt trained about said drum, substantially as described.

2. A machine for compressing a plastic mass into a predetermined form comprising in combination, a fixed shaft, an eccentric non-rotatively and adjustably mounted on said shaft, a perforated drum loosely disposed on said eccentric, disks concentrically mounted on said shaft one on each side of said drum, a felt or like belt trained about the lower portion of said disks and bridging said drum and forming the lower wall of a compressing passage, a felt or like belt trained about said drum between said disks and forming the opposite wall of said passage, the eccentricity of the drum with respect to said disks reducing the discharge end of said passage with respect to the intake end thereof, substantially as described.

In testimony whereof I affix my signature in presence of two witnesses.

ENGELBERT PROSIG.

Witnesses:
 ALFRED BERAN,
 AUGUST FUGGER.